(12) United States Patent
Tang

(10) Patent No.: US 7,775,467 B2
(45) Date of Patent: Aug. 17, 2010

(54) ELECTRIC CONDIMENT GRINDER

(75) Inventor: Wing Sum Tang, Hong Kong (HK)

(73) Assignee: Samson Bright Industrial Company Limited, Hunghom, Kowloon, Hong Kong (CN)

( * ) Notice: Subject to any disclaimer, the term of this patent is extended or adjusted under 35 U.S.C. 154(b) by 0 days.

(21) Appl. No.: 12/316,896

(22) Filed: Dec. 16, 2008

(65) Prior Publication Data

US 2010/0147982 A1    Jun. 17, 2010

(51) Int. Cl.
 *A47J 42/00* (2006.01)
(52) U.S. Cl. .................................. 241/169.1
(58) Field of Classification Search ........... 241/168, 241/169.1, 258
 See application file for complete search history.

(56) References Cited

U.S. PATENT DOCUMENTS

| | | | |
|---|---|---|---|
| 6,830,205 B2 | 12/2004 | Wang | |
| 6,962,302 B2 * | 11/2005 | Cheng | 241/169.1 |
| 7,234,658 B2 * | 6/2007 | Lee | 241/169.1 |
| 7,380,737 B2 * | 6/2008 | Wang | 241/169.1 |
| 7,604,189 B2 * | 10/2009 | Wang | 241/169.1 |
| 2003/0052207 A1 * | 3/2003 | Wu | 241/169.1 |
| 2006/0261198 A1 * | 11/2006 | Lee | 241/169.1 |

FOREIGN PATENT DOCUMENTS

| | | |
|---|---|---|
| CH | 608365 A5 | 1/1979 |
| EP | 1 449 471 A1 | 8/2004 |

OTHER PUBLICATIONS

Patents Act 1977: Combined Search and Examination Report under Sections 17 and 18(3) for United Kingdom Counterpart Application No. GB 0820715.1, 6 pgs. (Feb. 17, 2009).

* cited by examiner

*Primary Examiner*—Faye Francis
(74) *Attorney, Agent, or Firm*—Blakely, Sokoloff, Taylor & Zafman LLP

(57) ABSTRACT

A cordless electric condiment grinder includes a hollow housing elongated to extend between a base for supporting the grinder uprightly and an opposing top, the top of the housing having a bulbous form to define a condiment reservoir. A rotary grinding mechanism is disposed in a lateral opening in the top of the housing and a tilt switch controls operation of the grinding mechanism, allowing freshly ground condiment to be dispensed automatically upon rotating the grinder through an acute angle and thus is particularly suited for use by people with limited dexterity.

12 Claims, 3 Drawing Sheets

ELECTRIC CONDIMENT GRINDER

TECHNICAL FIELD

The present invention relates to grinders for condiments such as pepper or salt, and particularly to grinders driven by electric motors

BACKGROUND OF THE INVENTION

Hand-held cordless electric grinders provide a convenient and fast method for dispensing freshly ground pepper, salt, or other condiments. A conventional grinder of this type has an elongate housing which defines a grip by which the grinder is held and which has first and second longitudinally opposing ends. A battery compartment at the first end of the housing provides power to an electric motor connected via a speed reduction geartrain to a drive shaft. The drive shaft extends through a condiment reservoir to a grinding mechanism at the second end of the housing. In an upright design the second end may be supported on a table, or a like horizontal surface, when not in use. However, a drawback of this is that, following use, the impact caused by placing the grinder upon a table tends to dislodge condiment particles from or through the grinding mechanism which drop from the grinder and, for instance, may soil a table cloth.

An inverted design is therefore preferable, in which the first end is adapted to be supported upon the table so that the second end is uppermost and a recess is provided in the housing to catch any particles dislodged following use. However, an inverted grinder of this type has ergonomic drawbacks as it is necessary to rotate the grinder approximately 180° to dispense the ground condiment and this can be troublesome for people having reduced mobility of the forearm and wrist. Moreover, operating a switch to initiate grinding at the same time as rotating the grinder in this manner can pose further difficulties to disabled people. One object of the invention is to provide a condiment grinder which addresses these drawbacks.

There is a continuing need for improvements to electric condiment grinders of this type. In particular there is a need for designs that are able to be manufactured more cost-effectively. The grinder should have an efficient geartrain with a low weight and inertia and which can be readily installed. It should also be compact with coaxial drive and driven shafts, quiet in operation, while being able to operate at high motor speeds. It is a further object of the present invention to address the above needs or more generally to provide an improved condiment grinder.

DISCLOSURE OF THE INVENTION

According to one aspect of the present invention there is provided a condiment grinder comprising:

a hollow housing elongated to extend between a base for supporting the grinder uprightly and an opposing top, the top of the housing defining a condiment reservoir;

a filling opening in the reservoir for loading condiment;

a lateral opening in the housing, the lateral opening in communication with the reservoir;

an electric motor within the housing;

a battery holder within the housing, the battery holder having contacts for engaging the terminals of batteries received therein;

a switch electrically connected to the contacts for selectively supplying power to the motor;

a rotary grinding mechanism for grinding the condiment, the grinding mechanism being disposed in the lateral opening to dispense ground condiment therethrough, and transmission means for transmitting torque from the motor to the grinding mechanism.

Preferably the top and the base of the housing are relatively broad and are separated by a waist portion adapted to provide a grip for holding the grinder, the base has a planar surface for supporting the grinder upright and the top has a convex surface.

Preferably a recess in the housing extends about the lateral opening, the recess having peripheral walls, the grinding mechanism being completely recessed within the housing and a lower section of the peripheral walls being upwardly concave to catch any condiment particles dislodged from or through the grinding mechanism when the grinder is generally upright.

Preferably the switch is a tilt switch for automatically actuating the motor when the grinder is tilted from an upright position to direct the lateral opening downwardly.

Preferably the grinding mechanism includes a rotor and stator cooperating for grinding the condiment therebetween, the stator being fixed in the lateral opening, the rotor being mounted to a drive shaft extending through the reservoir, the transmission means includes an epicyclic geartrain driven by the motor and a bevel gear pair connected between the epicyclic geartrain and the drive shaft. Preferably the motor and epicyclic geartrain are generally disposed within the waist portion.

Preferably one bevel gear of the bevel gear pair, the epicyclic geartrain and an output shaft of the motor are coaxial with a first axis, the first axis being inclined acutely to a longitudinal axis of the waist portion and the other bevel gear of the bevel gear pair is coaxial with the drive shaft to rotate about a second axis orthogonal to the first axis.

Preferably the epicyclic geartrain includes a plurality of spur gear epicyclic gearsets, each gearset comprising planet gears meshed with a sun gear, the planet gears of each gearset supported upon a planet carrier, the gearsets stacked within a common ring gear with the sun gears coaxial, adjacent sun gears and planet carriers of adjacent gearsets being rotationally fast for transmitting torque between the adjacent gearsets.

This invention provides a grinder which is ergonomically efficient in operational use. It is particularly well-suited to use by people having reduced mobility of the forearm and wrist, who are able to operate the grinder simply by grasping and rotating it through a small angle, preferably of 40° to 50°. Moreover this is achieved with a design able to catch any condiment particles dislodged from or through the grinding mechanism when the grinder is generally upright. It has a simple construction employing a number of common parts for reduced manufacturing costs. It includes modular components with a low weight and inertia, it is compact, relatively efficient and quiet in operation, and is able to operate at high motor speeds.

BRIEF DESCRIPTION OF THE DRAWINGS

Preferred forms of the present invention will now be described by way of example with reference to the accompanying drawings, wherein.

DESCRIPTION OF THE PREFERRED EMBODIMENTS

Figures 1, 2:
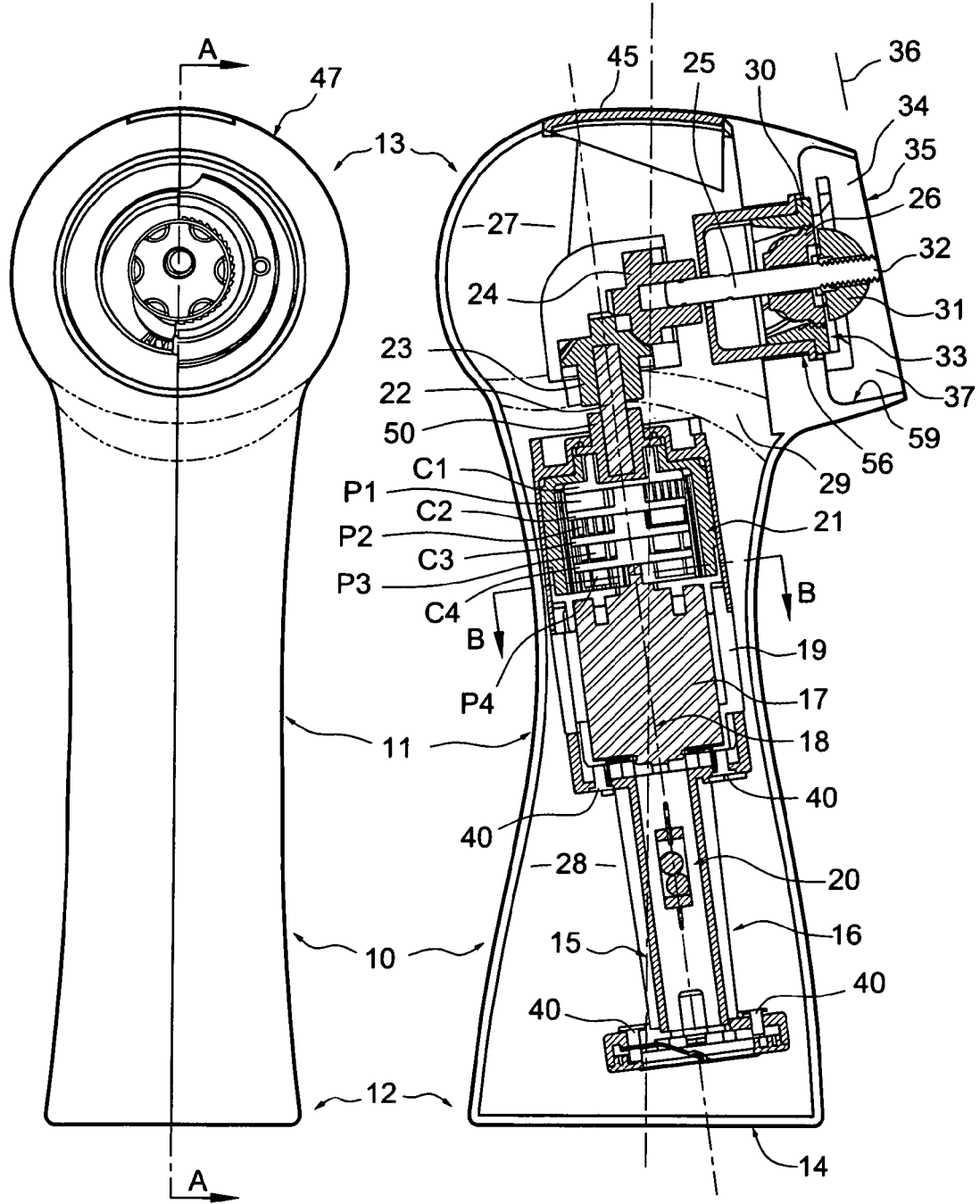
FIG. 1 is a side elevation of an exemplary embodiment of the grinder of the invention.
FIG. 2 is a schematic central longitudinal cross section along line AA of FIG. 1.
Figure 3:
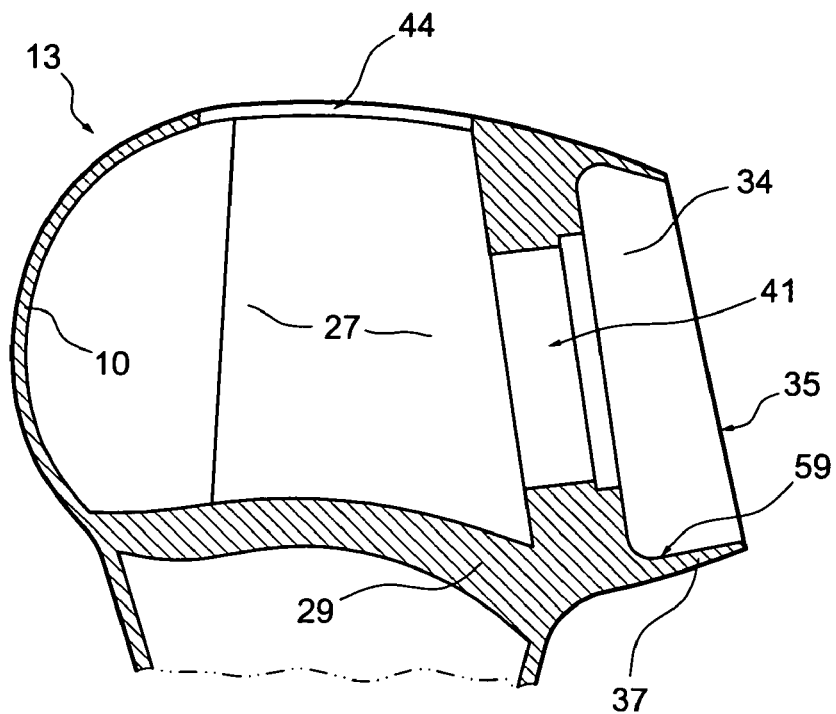
FIG. 3 is a schematic fragmentary longitudinal cross section of the housing of the grinder of FIG. 1.
Figure 4:
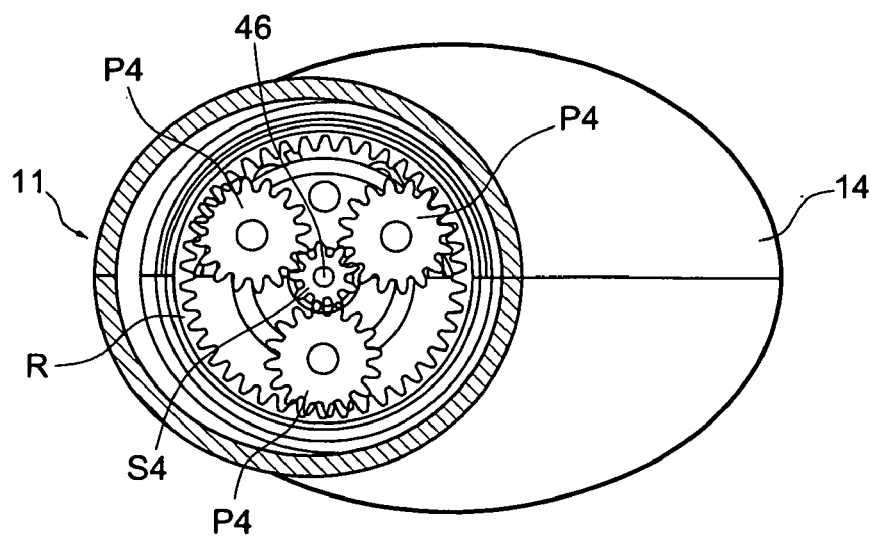
FIG. 4 is a transverse cross section along line BB of FIG. 2.
Figure 5:
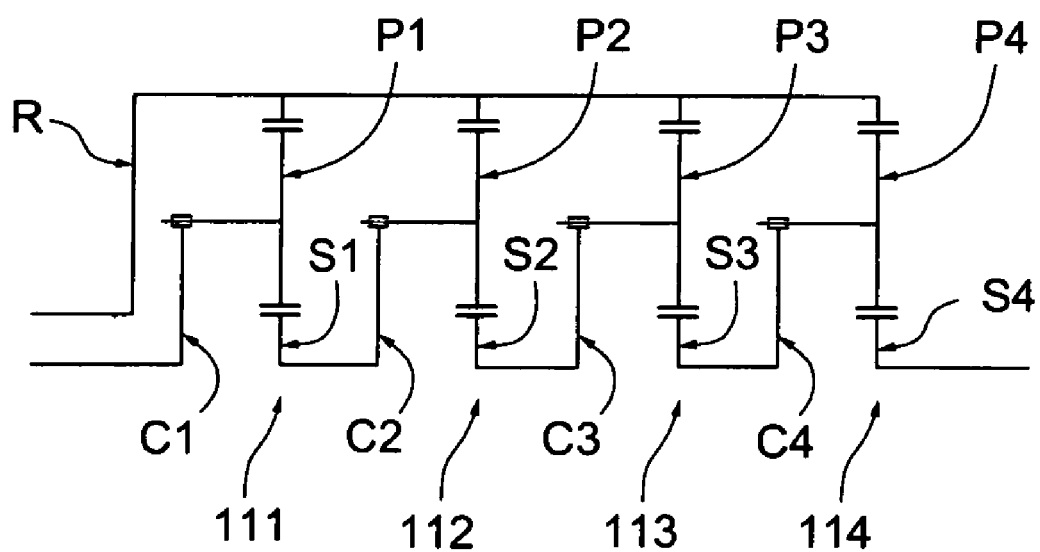
FIG. 5 is a schematic of the gear train of the grinder of FIG. 1.

Referring to FIGS. 1-5 of the drawings, a hand-held cordless electric grinder according to an exemplary embodiment of the invention includes a hollow housing 10 having an asymmetrical waisted form, with an elongate waist portion 11 which provides a grip for holding the grinder. The waist portion 11 separates the base 12 from the bulbous top 13 which both have relatively broader dimensions. The base 12 has a planar face 14 for supporting the grinder upright on a horizontal surface, the face 14 extending orthogonally to a longitudinal upright axis 15 of the waist portion 11.

A battery holder 16 is provided in the housing 10 below an electric motor 17 having a shaft 46 rotating about the drive axis 18 which is inclined acutely to the axis 15. The battery holder 16 has contacts 40 for abutting the battery terminals (not shown). The battery holder 16 and motor 17 are fixed inside a tubular mounting assembly 19, to one axial end of which the battery holder 16 is fixed. The battery holder 16 is located near the base 12, such that with batteries in place the centre of gravity is lowered for stability.

Mounted to the battery holder 16 is a tilt switch 20 which is electrically connected in a circuit (not shown) between the contacts 40 and the motor 17 to control operation of the motor depending upon the inclination of the grinder. The tilt switch preferably has a differential angle of 40°-50° and in the preferred embodiment shown is a roller ball type.

An epicyclic geartrain 21 driven by the motor 17 supplies torque through a shaft 22 to a bevel gear pair 23, 24. The shaft 22, bevel gear 23 and geartrain 21 are coaxial with the motor axis 18. The bevel gear 23 is meshed with bevel gear 24 to transmit the torque through 90° to a drive shaft 25 extending through a condiment-receiving reservoir 27 bounded by the external walls in the bulbous top 13 and an internal wall 29.

The motor 17, battery holder 16 and epicyclic geartrain 21 are received in a recess 28 in the housing 10 separated from the condiment reservoir 27 by the internal wall 29.

The outer end of the shaft 25 drives a grinding mechanism 56. The shaft 25 is rotationally fast with the grinding rotor 26 which cooperates with, and is generally received within, a grinding stator 30 for grinding the condiment therebetween. The grinding mechanism 56 is of a unidirectional type, which has helical teeth (not shown) and thus operates best in one direction. An adjuster nut 31 received on a threaded tip 32 of the shaft 25 engages and moves the rotor 26 axially for adjusting the size of the annular discharge opening 33 between the rotor 26 and stator 30, and hence the fineness of the ground condiment. The stator 30 is fixed in a lateral opening 41 in bulbous top 13 in which the reservoir 27 is formed. An upper opening 44 in the reservoir 27 is provided for loading condiment and is closed by a closure 45.

The lateral opening 41 in the housing 10 is provided in the top 13. The components of the grinding mechanism, including the rotor 26, stator 30 and adjuster nut 31 are completely recessed within the housing 10. Ground condiment from the discharge opening 33 passes out through the recess 34 in use. The recess 34 extends about the lateral opening 41 and has annular peripheral walls 37 and a rim 35 lying in a plane 36 inclined acutely to the upright axis 15 and the lateral opening 41 extends centrally through the recess 34. The lower section of the walls 59 is upwardly concave to catch any condiment particles dislodged from or through the grinding mechanism 56 when the grinder is generally upright.

The epicyclic geartrain 21 includes four spur gear epicyclic gearsets 111-114 mounted coaxially. Each of the gearsets 111-114 comprises planet gears P1, P2, P3, P4 meshed with a respective sun gear S1, S2, S3, S4 and supported upon a planet carrier C1, C2, C3, C4. The planet carriers C2, C3, C4 are of common construction, each integrally formed and rotationally fast with a respective one of the sun gears S1, S2, S3. The planet carriers C1, C2, C3, C4 include three integral parallel, equally angularly spaced shaft portions for supporting the three planet gears P1, P2, P3, P4. The gearsets 111-114 are stacked within a non-rotating ring gear R, with which all the planet gears P1, P2, P3, P4 mesh. At the output of the geartrain 21 a coupler 50 transmits torque from the carrier C1 to the shaft 22, while at the input to the geartrain the motor shaft 46 is rotationally fast with the sun gear S4.

In use, pepper may be placed in reservoir 27. Grasping the waist portion 11 and tilting the grinder about 40°-50° from the horizontal to incline the recess 34 downwardly is sufficient to cause the motor 17 to be actuated by operation of the tilt switch 20. Torque is thus transmitted through the epicyclic geartrain 21, shaft 22, bevel gear pair 23, 24, and shaft 25 to the grinding mechanism 56. Condiment drops from the reservoir 27 into the grinding mechanism 56 and thus passes in ground form through the lateral opening from which it is dispensed. The tilt switch 20 opens when the grinder is supported upright when not in use, to stop the motor.

Aspects of the present invention have been described by way of example only and it should be appreciated that modifications and additions may be made thereto without departing from the scope thereof.

What is claimed is:

1. A condiment grinder comprising:
   a hollow housing elongated to extend between a base for supporting the grinder uprightly and an opposing top, the top of the housing defining a condiment reservoir;
   a filling opening in the reservoir for loading condiment;
   a lateral opening in the housing, the lateral opening in communication with the reservoir;
   an electric motor within the housing;
   a battery holder within the housing, the battery holder having contacts for engaging the terminals of batteries received therein;
   a switch electrically connected to the contacts for selectively supplying power to the motor;
   a rotary grinding mechanism for grinding the condiment comprising a rotor and a stator which cooperate to grind the condiment therebetween, the stator being fixed in the lateral opening and the rotor being mounted to a drive shaft extending through the reservoir; and
   a transmission comprising an epicyclic geartrain driven by the motor and a bevel gear pair connected between the epicyclic geartrain and the drive shaft for transmitting torque from the motor to the grinding mechanism.

2. The grinder of claim 1 wherein the top and the base of the housing are relatively broad and are separated by a waist portion adapted to provide a grip for holding the grinder, the base has a planar surface for supporting the grinder upright and the top has a convex surface.

3. The grinder of claim 2 wherein a recess in the housing extends about the lateral opening, the recess having peripheral walls, the grinding mechanism being completely recessed within the housing and a lower section of the peripheral walls being upwardly concave to catch any condiment particles dislodged from or through the grinding mechanism when the grinder is generally upright.

4. The grinder of claim 1 wherein the switch is a tilt switch for automatically actuating the motor when the grinder is tilted from an upright position to direct the lateral opening downwardly.

5. The grinder of claim 1 wherein the motor and epicyclic geartrain are generally disposed within the waist portion.

6. The grinder of claim 1 wherein one bevel gear of the bevel gear pair, the epicyclic geartrain and an output shaft of the motor are coaxial with a first axis, the first axis being inclined acutely to a longitudinal axis of the waist portion and the other bevel gear of the bevel gear pair is coaxial with the drive shaft to rotate about a second axis orthogonal to the first axis.

7. The grinder of claim 1 wherein the epicyclic geartrain includes a plurality of spur gear epicyclic gearsets, each gearset comprising planet gears meshed with a sun gear, the planet gears of each gearset supported upon a planet carrier, the gearsets stacked within a common ring gear with the sun gears coaxial, adjacent sun gears and planet carriers of adjacent gearsets being rotationally fast for transmitting torque between the adjacent gearsets.

8. A condiment grinder comprising:
a hollow housing elongated to extend between a base for supporting the grinder uprightly and an opposing top, the top of the housing defining a condiment reservoir, the top and the base of the housing are relatively broad and are separated by a waist portion adapted to provide a grip for holding the grinder, the base has a planar surface for supporting the grinder upright and the top has a convex surface;
a filling opening in the reservoir for loading condiment;
a lateral opening in the housing, the lateral opening in communication with the reservoir;
an electric motor within the housing;
a recess in the housing extending about the lateral opening, the recess having peripheral walls a lower section of the peripheral walls being upwardly concave to catch any condiment particles dislodged from or through the grinding mechanism when the grinder is generally upright;
a battery holder within the housing, the battery holder having contacts for engaging the terminals of batteries received therein;
a tilt switch electrically connected to the contacts for selectively supplying power to the motor when the grinder is tilted from an upright position to direct the lateral opening downwardly;
a rotary grinding mechanism for grinding the condiment, the grinding mechanism being disposed in the lateral opening to dispense ground condiment therethrough, the grinding mechanism being completely recessed within the housing such that the upwardly concave section of the peripheral walls catches any condiment particles dislodged from or through the grinding mechanism when the grinder is generally upright, and
a transmission for transmitting torque from the motor to the grinding mechanism.

9. The grinder of claim 8 wherein the grinding mechanism includes a rotor and stator cooperating for grinding the condiment therebetween, the stator is fixed in the lateral opening, the rotor is mounted to a drive shaft extending through the reservoir, and the transmission includes an epicyclic geartrain driven by the motor and a bevel gear pair connected between the epicyclic geartrain and the drive shaft.

10. The grinder of claim 9 wherein the motor and epicyclic geartrain are generally disposed within the waist portion.

11. The grinder of claim 10 wherein one bevel gear of the bevel gear pair, the epicyclic geartrain and an output shaft of the motor are coaxial with a first axis, the first axis being inclined acutely to a longitudinal axis of the waist portion and the other bevel gear of the bevel gear pair is coaxial with the drive shaft to rotate about a second axis orthogonal to the first axis.

12. The grinder of claim 11 wherein the epicyclic geartrain includes a plurality of spur gear epicyclic gearsets, each gearset comprising planet gears meshed with a sun gear, the planet gears of each gearset supported upon a planet carrier, the gearsets stacked within a common ring gear with the sun gears coaxial, adjacent sun gears and planet carriers of adjacent gearsets being rotationally fast for transmitting torque between the adjacent gearsets.

* * * * *